United States Patent [19]

Thompson

[11] 3,875,450

[45] Apr. 1, 1975

[54] CATHODE-RAY TUBE WITH RADIATION-EMITTING INDEX STRIP-LIKE AREAS

[75] Inventor: Roger Dunwoody Thompson, Lancaster, Pa.

[73] Assignee: RCA Corporation, New York, N.Y.

[22] Filed: Feb. 26, 1973

[21] Appl. No.: 335,537

[52] U.S. Cl. .................................. 313/471, 358/67

[51] Int. Cl. ........................ H01j 31/20, H01j 29/34

[58] Field of Search ................ 313/92 BI; 178/5.4 F

[56] References Cited

UNITED STATES PATENTS

| | | | |
|---|---|---|---|
| 2,633,547 | 3/1953 | Law | 313/92 BI |
| 2,771,503 | 11/1956 | Schwartz | 313/92 BI |
| 2,962,546 | 11/1960 | Thompson | 313/92 BI X |
| 3,271,610 | 9/1966 | Law | 178/5.4 F X |
| 3,280,358 | 10/1966 | Thompson | 178/5.4 F X |
| 3,443,139 | 5/1969 | Thompson | 313/92 BI |

*Primary Examiner*—Robert Segal
*Attorney, Agent, or Firm*—G. H. Bruestle; L. Greenspan

[57] ABSTRACT

A cathode-ray tube, such as a color television picture tube of the feedback or sensing type including a viewing screen comprising an array of different color light-emitting phosphor strips, and indexing means comprising a periodic series of spaced indexing strip-like areas extending parallel to the phosphor strips. The elements of one of the indexing strip-like areas or the spaces therebetween alternate in width across the screen between two different values. The elements of the other of the indexing strip-like areas and the spaces therebetween are of substantially equal width. In operation, beam-produced control signals from the indexing strip-like areas are processed to produce a periodic signal wave, which is used to synchronize the application of color signals to the beam with the instantaneous position of the beam on the screen.

9 Claims, 6 Drawing Figures

CATHODE-RAY TUBE WITH RADIATION-EMITTING INDEX STRIP-LIKE AREAS

BACKGROUND OF THE INVENTION

This invention relates to sensing cathode-ray tubes and particularly to a color television picture tube having an electron-sensitive color viewing screen which includes means responsive to electron bombardment for generating indexing signals for the purpose of synchronizing the color modulation of the electron beam with the scan thereof.

Sensing cathode-ray tubes, sometimes known as "feedback tubes," are well known. Briefly, one type of such tube includes, as part of a target structure, a mosaic luminescent viewing screen comprising a series of color phosphor groups, each of which is made up of a plurality (e.g., three) of different color phosphor strips or stripes disposed parallel to each other and substantially perpendicular to the direction of the beam scan. The target structure includes also a plurality of spaced-apart short-persistence light-emitting (e.g., ultraviolet) indexing strip-like areas disposed on the back of, and parallel to, the color phosphor strips. The tube envelope is provided with a light-transmitting (e.g., ultraviolet-transmitting) window rearwardly of the target structure. A phototube located outside the cathode-ray tube can pick up the indexing signals which are generated when the electron beam scans across the indexing strip-like areas.

The indexing signals derived from the indexing strip-like areas provide information regarding the actual instantaneous position of the electron beam on the viewing screen with relation to the color phosphor strips. The indexing signals are employed in a signal-utilization system of a type known in the art (such as U.S. Pat. No. 2,633,547 to H. B. Law) to insure that the proper electrical color signal is applied to the electron beam at all times.

It is known to employ a viewing screen wherein one indexing strip-like area is provided for each group, or triad, of three different color phosphor strips. In such an arrangement (as well as others) that employs a single electron beam, the color signal modulation applied to the beam causes a distortion of the indexing signal, so that the indexing signal varies in accordance with picture content and does not always accurately represent the point of impingement of the beam on the screen. This distortion of the indexing signal by the video signal is called "color pulling," or "video pulling," which are synonymous.

One prior system, described in my U.S. Pat. No. 2,962,546, is designed to perform with minimal color pulling. It utilizes a sensing-type cathode-ray tube wherein the indexing signal produced has a three-level (or more) stepped distribution; for example, a structure which has zero, maximum, and intermediate amplitude levels of response to the electron beam impingement. This stepped signal may be produced by providing indexing strip-like areas having different-thickness portions. The thicknesses of the various portions must be accurately controlled. It is both difficult and costly to manufacture such controlled thicknesses.

U.S. Pat. No. 3,271,610 to H. B. Law discloses a sensing-type cathode-ray tube comprising other indexing structures for producing a three (or more) level stepped indexing signal. In one embodiment thereof, the indexing signal-generating means comprises a continuous layer of indexing phosphor and a number of parallel, light-opaque strips, these strips being superimposed on the phosphor layer in various relationships. My U.S. Pat. No. 3,443,139 discloses a sensing-type cathode-ray tube in which the indexing means comprises a series of indexing strip-like areas individually having serrated edges of optimum width for minimum color pulling. These prior indexing means also are complex and difficult to manufacture in quantity production.

SUMMARY OF THE INVENTION

The target structure of the novel sensing-type color picture tube comprises a viewing screen including a periodic series of light-emitting color phosphor strips, and indexing means including a periodic series of spaced indexing strip-like areas extending parallel to the light-emitting strips. Either the indexing strip-like areas or the spaces therebetween are of equal widths, while the other of the two alternate in width across the screen between two different values. For minimum color pulling, the difference between the two different values is substantially equal to one twelfth the indexing pitch of the indexing means, and the average of the two different values equals one fourth the indexing pitch.

The employment of the present invention provides an indexing structure of relatively simple construction that is relatively easy to manufacture, which obviates the need for any of the complex structures previously suggested. The strip-like areas do not have critical thickness or edge pattern designs as in prior indexing means. In the operation of the novel tube, beam-produced signals derived from scanning the indexing means are converted to electrical signals, if necessary, and integrated to produce an electrical signal wave which is utilized to synchronize the application of color signals to the beam with the instantaneous position of the beam on the screen.

BRIEF DESCRIPTION OF THE DRAWINGS

Similar reference numerals are used for similar elements throughout the drawings.

DESCRIPTION OF PREFERRED EMBODIMENTS

Indexing means of prior sensing tubes employ indexing strip-like areas having critical thickness or edge pattern designs for providing the desired indexing information. It has now been discovered that such prior complex structures are unnecessary. Sufficient indexing information can be generated from nonoverlapping indexing strip-like areas of uniform thicknesses and smooth edges, provided either the strip-like areas or the spaces alternate in width between two different values.

Figure 1:
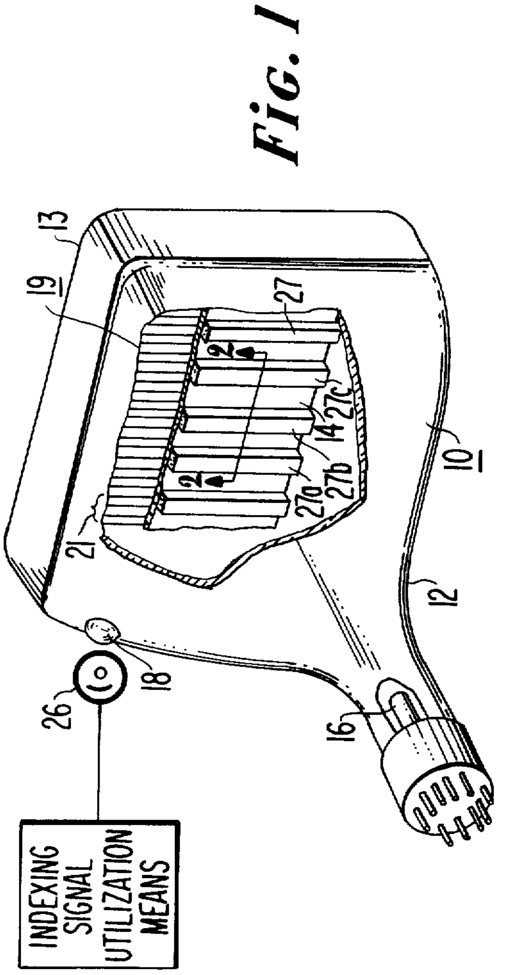
FIG. 1 is a perspective view, with parts broken away, of a sensing-type color television picture tube embodying the invention.
Figure 2:
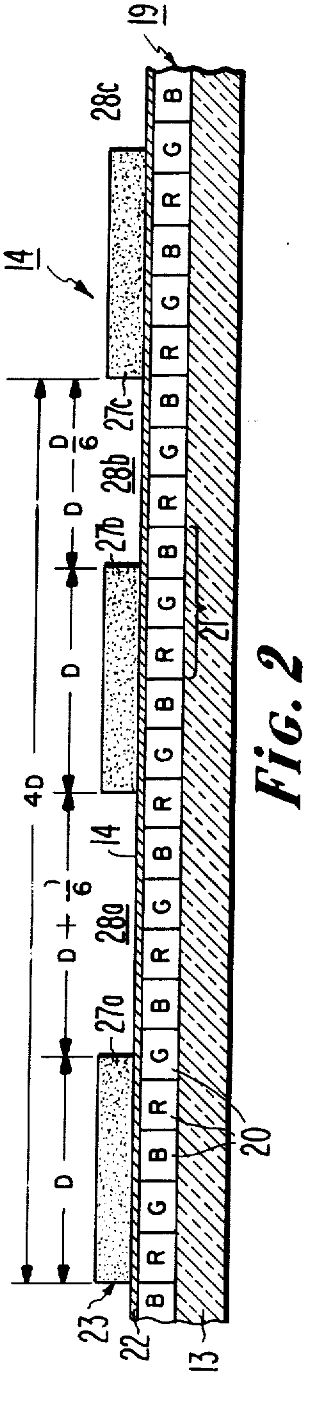
FIG. 2 is an enlarged sectional view of a portion of the target structure including emissive indexing strips of the tube of FIG. 1 viewed along the plane 2—2.

FIGS. 1 and 2 illustrate a color television picture tube 10 of the invention comprising an envelope 12 having a faceplate 13 with a target structure 14 disposed on the inner surface thereof. An electron gun 16 (shown in a simplified configuration) is disposed in the envelope 12 to project an electron beam toward the target structure 14. A window 18 is provided in the envelope 12 rearwardly of the target structure 14 for a purpose hereinafter described.

The target structure 14 comprises a mosaic layer 19 of electron-sensitive, different color light-emitting phosphor areas 20 that are shaped, for example, as strips, which constitute the viewing screen of the structure 14. The light-emitting color phosphor strips 20 may comprise, for example, red-emitting, green-emitting, or blue-emitting phosphors, some of which are designated in the drawings as R, G, and B, respectively. The mosaic layer 19 is made up of a series of recurring color groups or triads 21, each of which includes one of each of the R, G, and B color phosphor strips 20, in a predetermined order. The specific character of the color groups 21, for example, the widths of the light-emitting color phosphor strips 20, the emission colors of the color phosphor strips, the number of color phosphor strips for each group, and the color order of arrangement of the color phosphor strips within each group, may be chosen in accordance with known practice.

Superimposed on the back of the mosaic layer 19, and facing the electron gun 16, may be a conventional electron-permeable light-reflective layer 22. The light-reflective layer 22 may comprise, for example, a layer of vapor-deposited aluminum metal which is disposed on the mosaic layer 19 in accordance with known practice. A set or series 23 of mutually parallel, spaced-apart, single-layer indexing strips 27*a*, 27*b*, 27*c*, etc. is included in the target structure 14 and is disposed adjacent to the mosaic layer 19. Where, as in FIGS. 1 and 2, the target structure 14 includes a reflective layer (i.e., 22), the set 23 of indexing strips is disposed on the reflective layer 22.

The indexing strips 27*a*, 27*b*, 27*c*, etc. may be constituted by any radiation-emissive material. Preferably, the indexing strips emit short-persistence ultraviolet light and may comprise, for example, a cesium-lithium-activated calcium-magnesium-silicate phosphor of the type used for a P16 screen. Alternatively, other ultraviolet-emitting phosphors may be used, or phosphors which emit visible light may be used, or secondary electron-emitting materials (whose mode of operation is familiar to the art) may be used for the indexing strips. The individual indexing strips 27*a*, 27*b*, 27*c*, etc. are disposed in a systematic relationship with, and parallel to, the light-emitting color phosphor strips 20, R, B, and G, of the mosaic layer 19, as described in detail below. For example, one indexing strip may be provided for each three groups 21 of the color phosphor strips 20. However, other periodicity relationships of the indexing strips to the color phosphor strips R, B and G, of the mosaic layer 19, may be provided according to known practices.

The tube 10 can be operated with the type of external system described in the above-mentioned Thompson U.S. Pat. No. 2,962,546, utilizing a narrow-band-pass filter in the system to remove the modulation side bands. The system employed includes a photodetector device 26 (FIG. 1) for picking up the indexing radiation passing through the window 18 of the tube 10, which radiation is generated by the indexing strips 27*a*, 27*b*, etc., and converting this radiation into electrical signals. These signals are then utilized to insure the application of the proper electrical color signal to the electron beam at all times.

The set 23 of indexing elements consists essentially of a single group of single-layer (i.e., the individual strips are of uniform thickness thereacross) indexing strips 27*a*, 27*b*, 27*c*, etc., that are substantially identical in composition, configuration and size. The spaces 28*a*, 28*b*, etc., between adjacent ones of the indexing strips 27*a*, 27*b*, 27*c*, etc., alternate in width between two different dimensions. Alternate spaces 28*a* have a width larger than the width of the indexing strips 27*a*, 27*b*, etc., and intermediate spaces 28*b* have a width smaller than the width of the indexing strips. The span of two consecutive indexing strips (e.g., 27*a* plus 27*b*) plus two adjacent spaces (e.g., 28*a* plus 28*b*) is the indexing pitch and equals 4D.

For minimum color pulling, the following structure illustrated in FIG. 2 is recommended. The indexing pitch is 4D. The widths of all of the indexing strips are substantially equal to D. The two different widths of the spaces between the indexing strips alternate between D plus D/6 and D minus D/6 respectively, the difference between the two different indexing strip widths being 2 D/6 or D/3. The difference D/3 is one-twelfth of the indexing pitch 4D.

Figure 3:
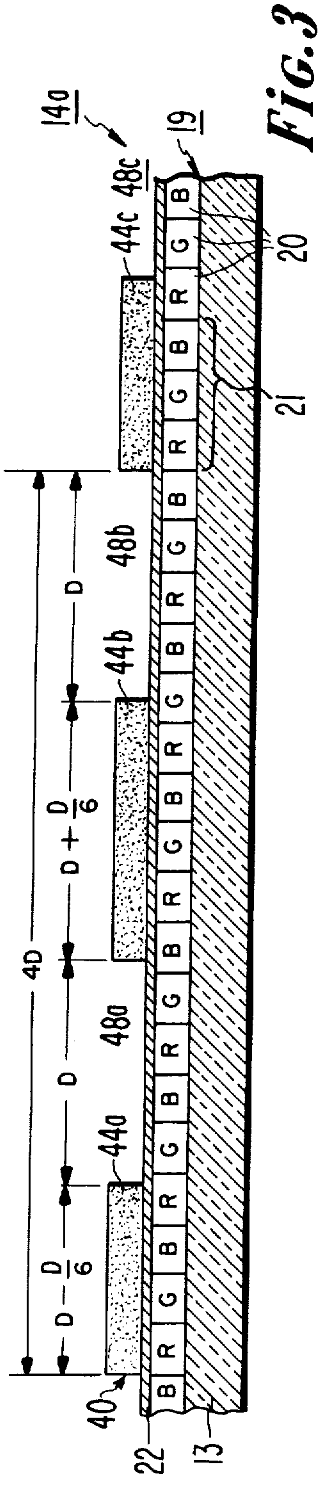
FIG. 3 is a sectional view, similar to FIG. 2, of another embodiment of the invention.

The signal-processing circuits used with the tube 10 should have a restricted band-pass characteristic, the center of which is at a frequency equal to the velocity of the beam across the target structure divided by the distance 2D. Such a circuit will have a harmonic decay after the introduction of pulses produced by the scanning of successive indexing strips. Thus, the signals produced by beam excitation of the indexing strips 27*a*, 27*b*, 27*c*, etc. do not have an instantaneous effect, but are sensed by a photodetector 26, which produces electrical signals which stimulate the oscillatory circuit to produce the desired synchronizing signals for the utilization means. Such integration of the various signals from an indexing structure having equal-width indexing elements separated by spaces that alternate in width, as in FIG. 2, results in significantly lower color pulling and other benefits and improvements. The same effect, generally speaking, is achieved where the indexing strips alternate in width and the spaces therebetween are equal in width, as described in a second embodiment of the invention illustrated in FIG. 3. The second embodiment employs a different target structure 14*a* in the tube 10 of FIG. 1. The target structure 14*a* comprises a set 40 of indexing strips 44*a*, 44*b*, 44*c*, etc., all of these indexing strips being substantially mutually parallel and of uniform thickness thereacross (i.e., single layer). Alternate individual indexing strips 44*a*, 44*c*, etc., are of a uniform first width and configuration and are narrower than those of the intermediate indexing strips 44*b*, etc., which are of a uniform second width. The spaces 48 between the various indexing strips 44*a*, 44*b*, 44*c*, etc. are uniform in width. In a preferred second embodiment, the narrower alternate indexing strips 44*a*, 44*c*, etc. have a first width substantially equal to D minus D/6, and the wider intermediate indexing strips **44*b* etc. have a width substantially equal to D plus D/6. The indexing pitch is 4D, being equal to the span of a narrow indexing strip (e.g., 44*a*) plus an adjacent space 48*a*, plus the span of a wide indexing strip (e.g., 44*b*) plus an adjacent space 48*b***.

As in the first embodiment, as the electron beam scans a raster on the target structure, the signals emitted from successive indexing strips are picked up by photodetector 26 and excite a self-oscillatory utilization circuit which effectively integrates the signals produced by the strips.

Figure 6:
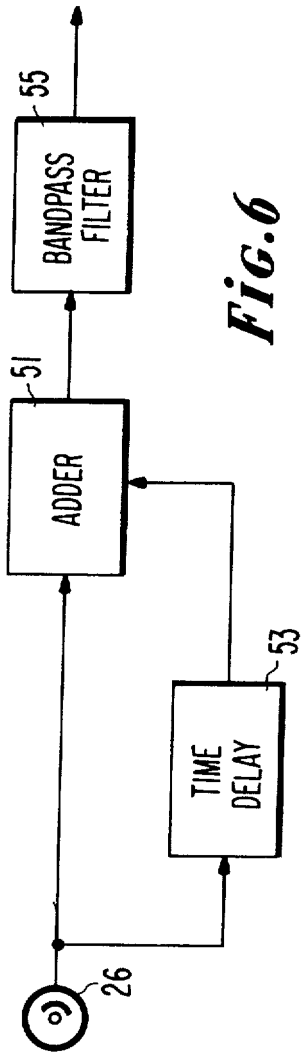
FIG. 6 is a schematic diagram of a circuit subsystem that may be employed in the indexing signal utilization means shown in FIG. 1.

One circuit system for using the signals derived from the structures of any embodiment herein is similar to a prior circuit system shown in FIG. 2 of my U.S. Pat. No. 2,962,546, except that the circuit subsystem illustrated in FIG. 6 is employed just after the photodetector 26. One portion of the electrical signal generated in the photodetector 26 is passed to an adder circuit 51. The other portion of the electrical signal is passed to a time delay circuit 53 and then to the adder circuit 51. The two signal portions are displaced from one another by the time required for the beam to scan a distance 2D of the indexing means. The two signal portions are then added together in equal magnitude in an adder circuit 51. The addition of the signals with the time difference produces a composite signal in which the complementary effects of the successive indexing strip-like areas are combined. Then, as in the above-cited prior circuit system, the composite signal is passed to a band pass filter circuit 55 which passes, for example, 2.1 megacycles.

While the invention has been described as applied to a sensing tube having spaced strips of light-emitting indexing material, other embodiments are within the scope of the invention. Instead of spaced strips of emissive indexing material, a continuous layer of emissive indexing material could be used with strips of opaque material exposing desired strip-like areas of the indexing layer in a manner similar to that shown in my U.S. Pat. No. 3,280,358 patented Oct. 18, 1966. Thus the structures of FIGS. 3 and 4 produce substantially identical indexing signals. And, the structures of FIGS. 2 and 5 produce substantially identical indexing signals. The phrase "strip-like areas" is intended to include the emissive areas of the indexing means shown in FIGS. 2 to 5.

Figure 4:
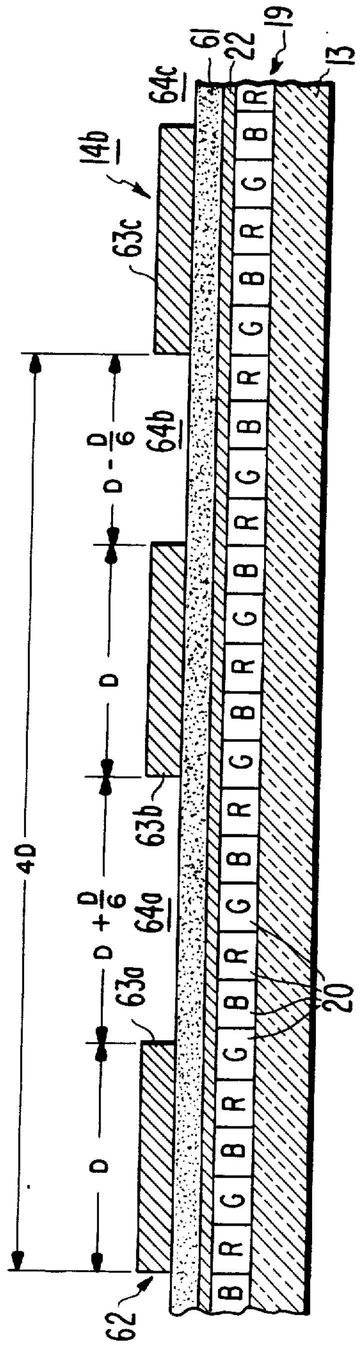
FIGS. 4 and 5 are sectional views similar to FIGS. 2 and 3 except that the luminescent indexing strips are replaced with a continuous emissive layer which is overlaid with spaced opaque strips which define emissive strip-like areas.
Figure 5:
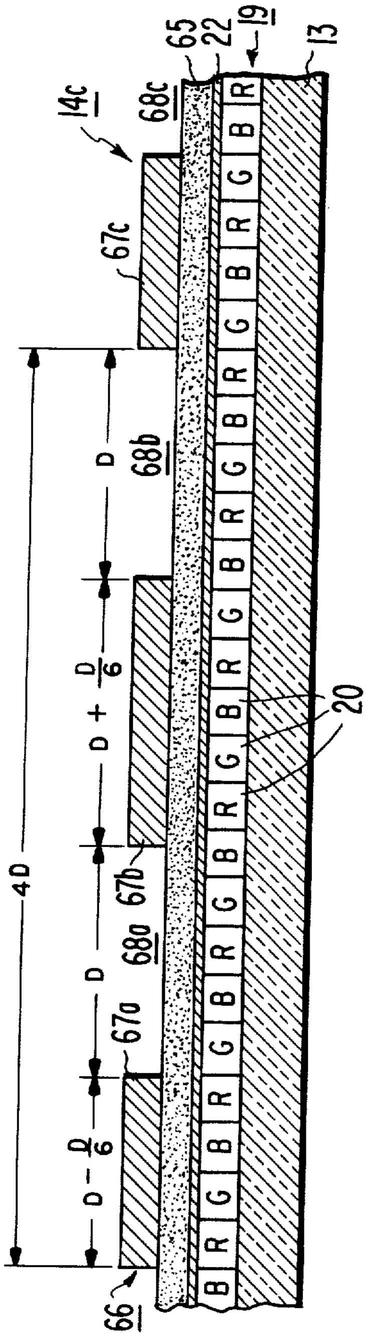

For example, the target structure **14*b* of FIG. 5 is similar to the target structure 14 of FIG. 2, except that the indexing strips 27*a*, 27*b*, 27*c*, etc. are replaced with an ultraviolet-emitting luminescent layer 61 of indexing material, which is overlaid with a set 66 of opaque strips 67*a*, 67*b*, 67*c*, etc. of carbon particles and spaces 68*a*, 68*b*, 68*c*, etc. The target structure 14*c* of FIG. 4 is similar to the target structure 14*a* of FIG. 3, except that the indexing strips 44*a*, 44*b*, 44*c*, etc. are replaced with an ultraviolet-emitting luminescent layer 65 of indexing material, which is overlaid with a set 62 of opaque strips areas 63*a*, 63*b*, 63*c*, etc. of carbon particles and spaces 64*a*, 64*b*, 64*c***, etc.

Instead of ultraviolet-emitting indexing material, a material with another light-emitting characteristic may be used in combination with a suitable detector.

Instead of light-emitting indexing material and a photodetector to pick up the light emitted thereby, a secondary electron-emitting indexing material and a special collector for collecting secondaries therefrom, the secondary electron current constituting the desired indexing signal, could be used, as is well known in the art.

What is claimed is:

1. A cathode-ray tube including a target structure and means for projecting an electron beam toward said target structure; said target structure comprising a viewing screen including a periodic series of color groups of parallel light-emitting color phosphor strips and an indexing means comprising a plurality of indexing strip-like areas of radiation-emissive indexing material and spaces therebetween, the color phosphor strips of each color group being adapted to emit different colors of light when scanned by said beam, and said strip-like areas having a response to the impingement of an electron beam different from said spaces, said strip-like areas, said spaces and said color phosphor strips being mutually parallel, one of said strip-like areas and said spaces being of substantially equal widths and the other of said strip-like areas and said spaces being alternately of two different widths, the average of said two different widths being substantially equal to said equal width, and the width of two consecutive strip-like areas and two spaces being equal to the width of six consecutive color groups.

2. The cathode-ray tube defined in claim 1, wherein said indexing strip-like areas have the same width, and said spaces therebetween alternate between two different widths.

3. The cathode-ray tube defined in claim 1, wherein said indexing strip-like areas alternate between two different widths and said spaces therebetween have the same width.

4. The cathode-ray tube defined in claim 1, wherein said indexing strip-like areas are strips of luminescent indexing material of a single uniform thickness.

5. The cathode-ray tube defined in claim 1, wherein said indexing means comprises a layer of emissive indexing material over said viewing screen and parallel strips of opaque material and spaces therebetween over said layer, said spaced opaque strips defining said indexing strip-like areas.

6. The cathode-ray tube defined in claim 1, wherein said equal widths are about a distance D and two different widths alternate between about D plus D/6 and about D minus D/6, where 4D is the indexing pitch of said indexing means.

7. A sensing-type color television picture tube comprising a target structure including a viewing screen and an electron-gun means for projecting an electron beam toward said target structure; said target structure comprising a. a periodic first series of color groups, each color group comprising three color phosphor strips, the three color phosphor strips of each color group being of different materials which emit in three different colors of light when scanned by said beam;

b. a light-reflective layer on said color phosphor strips, and c. a periodic second series of indexing groups on said light-reflective layer, each indexing group comprising two spaced strip-like areas of luminescent indexing material adapted to produce indexing signals when scanned by said beam, said indexing strip-like areas extending parallel to said color phosphor strips; the width of an indexing group being equal to the width of six consecutive color groups, said indexing strip-like areas and the spaces therebetween having respective width dimensions, alternate ones of said width dimensions being of equal value, each value greater than the width of one color group, and the other width dimensions alternating between two different values, each of said different values being greater than the width of one color group.

8. The color picture tube defined in claim 7, wherein said other width dimensions alternate between D plus D/6 and D minus D/6, where 4D is the pitch of said periodic series of spaced strip-like areas.

9. The color picture tube defined in claim 8, wherein the difference between said two different values is one twelfth the sum of the indexing pitch of said indexing means.

* * * * *